United States Patent [19]
Maseeh

[11] Patent Number: 6,157,900
[45] Date of Patent: *Dec. 5, 2000

[54] KNOWLEDGE BASED SYSTEM AND METHOD FOR DETERMINING MATERIAL PROPERTIES FROM FABRICATION AND OPERATING PARAMETERS

[75] Inventor: Fariborz Maseeh, Boston, Mass.

[73] Assignee: IntelliSense Corp., Wilmington, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/818,386

[22] Filed: Mar. 14, 1997

Related U.S. Application Data

[63] Continuation of application No. 08/702,199, Aug. 23, 1996, abandoned, which is a continuation of application No. 08/326,030, Oct. 19, 1994, abandoned.

[51] Int. Cl.$^7$ ........................................................ G06F 7/60

[52] U.S. Cl. ........................................ 703/2; 703/1; 703/7

[58] Field of Search ............................. 364/578; 395/500; 324/250; 703/2, 5, 7, 9, 11, 12, 1

[56] References Cited

U.S. PATENT DOCUMENTS

| | | | |
|---|---|---|---|
| 4,763,289 | 8/1988 | Barzilai et al. | 364/578 |
| 5,307,296 | 4/1994 | Uchida et al. | 364/578 |
| 5,446,870 | 8/1995 | Hinsberg, III et al. | 364/578 |
| 5,467,883 | 11/1995 | Frye et al. | 216/60 |
| 5,471,403 | 11/1995 | Fujimaga | 364/578 |

OTHER PUBLICATIONS

Maseeh et al, "Application of Mechanical–Technology CAD to Microelectronic Device Design and Manufacturing," Proceedings of the Ninth IEEE/CHMT Electronic Manufacturing Technology Symposium, pp. 350–355, 1990.

Maseeh et al, "A CAD Architecture for Microelectromechanical Systems," IEEE Micro Electro Mechanical Systems, pp. 44–49, 1990.

*Primary Examiner*—Kevin J. Teska
*Assistant Examiner*—Samuel Broda
*Attorney, Agent, or Firm*—Kirkpatrick & Lockhart LLP

[57] ABSTRACT

A knowledge based, computer-aided system and method is disclosed for simulating any set of linear or nonlinear simultaneous parametric dependencies. The preferred embodiment creates a model and provides an estimate of the material properties of materials comprising thin films disposed on semiconductor materials. However the system and method are suitable for creating a model and providing an estimate of the physical properties of materials undergoing other material fabrication processes that are dependent on several parameters. The method is suitable for implementation on exisitng general purpose computers. The method involves the general steps of entering parameter values for the material being subjected to the fabrication process, interrelating the user provided parameter values with a database of stored parameter values, calculating numerical solutions for the interrelated parameter and property values according to an Estimation Routine, and providing an output of numerical and graphical data relating to the desired physical properties. The system is capable of being implemented to include a dual hierarchical feedback and feedforeward loop where a control system uses the Estimation Routine to determine what additional data acquisition is required. Such a feedback loop could also be employed in conjunction with this method to yield an optimized value for the material properties in question.

18 Claims, 10 Drawing Sheets

KNOWLEDGE BASED SYSTEM AND METHOD FOR DETERMINING MATERIAL PROPERTIES FROM FABRICATION AND OPERATING PARAMETERS

This application is a continuation of application Ser. No. 08/702,199, filed on Aug. 23, 1996, now abandoned, which is a continuation of application Ser. No. 08/326,030, filed Oct. 19, 1994, now abandoned.

TECHNICAL FIELD OF INVENTION

The present invention relates to knowledge based methods for simulating any set of linear or nonlinear simultaneous parametric dependencies. In particular the invention relates to materials research and manufacturing, specifically on modeling thin films on semiconductor materials and other material fabrication processes that depend on several parameters. However the system and method disclosed herein are suitable for creating a model and providing an estimate of the physical properties of materials undergoing other material fabrication processes that are dependent on several parameters.

BACKGROUND OF INVENTION

The need for smaller, higher performance, and more complex electronic devices increases dramatically with each new generation of device. Accordingly the complexity of the process of designing and fabricating semiconductor materials necessary to meet these needs has also increased. With this increase in complexity has come an increase in cost. This increase in cost is due in large part to the critical need for optimal material selection and processing in the semiconductor design and fabrication process. As the demanded complexity increases, the materials required to provide this desired complexity become increasingly critical.

Design and process engineers must know how the materials that they select for fabrication behave under the changing parameters of the fabrication process. To obtain accurate data concerning property values for the materials that they are dealing with, the designers must manually search through many sources of information. Often the available sources do not contain complete or sufficiently accurate information. As a result design engineers rely on trial-and-error fabrication runs to gain experience concerning how the selected materials behave under changing process parameters.

As the complexity of the devices required continues to increase, this approach of using many time and resource consuming design-fabricate-test iterations becomes increasingly cost prohibitive.

In view of the foregoing, it is apparent that a need exists for a thin film material modeling and analysis tool that can reduce the cost involved with designing, fabricating, and testing a semiconductor or Micro-Electrical-Mechanical (MEMS) device by reducing the number of design-fabricate-test iterations necessary to yield the desired characteristics. Central to such an analysis tool is a readily available and accurate database of measured data regarding the properties of the materials involved in fabrication. Such an analysis tool would allow the designer to reduce the number of iterations in the design process by accurately modeling the design-fabricate-test process without actually fabricating and testing the devices. Such a tool would create a much needed savings in both time, materials, and cost.

SUMMARY OF INVENTION

According to the present invention, the foregoing and other objects and advantages are best obtained by the knowledge based system and method disclosed herein.

The knowledge based system according to the present invention utilizes an Estimation Routine for the prediction of thin film material properties based on their fabrication conditions and on the multidimensional interpolation and extrapolation (and other estimation methods) of experimental property data in the database.

Upon reviewing and evaluating the output data, the Operator can change the process parameters initially entered into the system. The Operator, therefore, can optimize material properties for a specific application without using a laboratory or conducting time consuming or expensive tests. Literature search time and expense can be reduced not only by the embedded database but by the estimations of property values that are not explicitly listed in previously gathered research.

If the estimate requested falls outside the scope of available experimental results, this method reduces the number of experiments needed to characterize multidimensional parametric dependencies. This will enable much quicker and cheaper prototyping in technologies such as semiconductor or microelectromechanical device fabrication.

Another advantage to this method is that a material can be implemented with less specialized education in the art of material fabrication. By using this invention, the Operator can simulate fabrication trial and error in a shorter time. The invention provides a cheaper and faster alternative to the extensive experimentation currently necessary to prototype new materials and devices.

In view of the foregoing, it is apparent that a need exists for a thin film material modeling program. It is therefore a primary object of the invention to provide a system and method to estimate and qualify specific material property values for any set of fabrication or operating conditions for materials.

It is another object of the invention to provide a MPSS that is applicable to all forms of materials whose properties may be dependent on several parameters including thin films for semiconductor and microelectromechanical fabrication.

It is another object of the invention to provide a MPSS that can be used to control and simulate thin film fabrication of all types of materials including metals, compounds, ceramics, semiconductors and glass.

It is another object of the invention to provide a MPSS which is coupled to a cognitive user-interface capable of providing the Operator with a tabular or graphical representation of the MPSS estimation.

It is another object of the invention to provide a MPSS whereby the user-interface is highly interactive, thus allowing the Operator to optimize the material properties by modifying the fabrication parameters.

It is another object of the invention to provide a MPSS that contains a database system of measured properties of the materials of interest.

It is another object of the invention to provide a MPSS that estimates material properties by implementing an Estimation Routine capable of interpolating and extrapolating fabrication data either within the parameter space bounded by the set of available measured property values, or within 50% of its range outside.

It is another object of the invention to provide a MPSS which can predict the state of stress in thin films.

It is another object of the invention to provide a MPSS which can predict numerous other thermal, physical, electrical, mechanical, and optical material properties, including but not limited to bi-axial modulus, birefringence, coefficient of thermal expansion, density, dielectric constant, dynamic tensile modulus, moisture absorption, Poisson's Ratio, refractive index, electrical resistivity, stress relaxation time, strain, state transition temperatures, tangent of delta, thermal conductivity, ultimate tensile strength, and Young's Modulus.

It is another object of the invention to provide a MPSS that consistently yields reliable accuracy or error estimations.

It is yet another object of the invention to provide a MPSS which implements an Estimation Routine which may be adapted to any user-interface.

It is yet another object of the invention to provide a MPSS which is capable of modeling and representing data in one, two, or three dimensions.

It is yet another object of the invention to provide a MPSS that allows the Operator to display data and estimations in an arbitrary or standard system of units.

It is yet another object of the invention to provide a MPSS that allows the addition of data as either a supplement or substitution for the internal database.

It is yet another object of the invention to provide a MPSS that can estimate property values for fabrication processes of any number of parameters.

Still other objects and advantages of the invention will become readily apparent to those skilled in this art from the following detailed description of the preferred embodiment, wherein we have shown and described only the preferred embodiment of the invention. As will be realized, the invention is capable of other and different embodiments, and its several details are capable of modifications in various obvious aspects, all without departing from the invention. Accordingly, the drawing and description are to be regarded as illustrative in nature, and not as restrictive.

BRIEF DESCRIPTION OF DRAWINGS

The foregoing summary, as well as the following detailed description of a preferred embodiment of the invention, will be better understood when read in conjunction with the appended drawings. For purposes of illustrating the invention, there is shown in the drawings an embodiment which is presently preferred. It should be understood, however, that the invention is not limited to the precise arrangement and instrumentality shown. In the drawings.

DETAILED DESCRIPTION OF PREFERRED EMBODIMENT OF INVENTION

Figure 1:
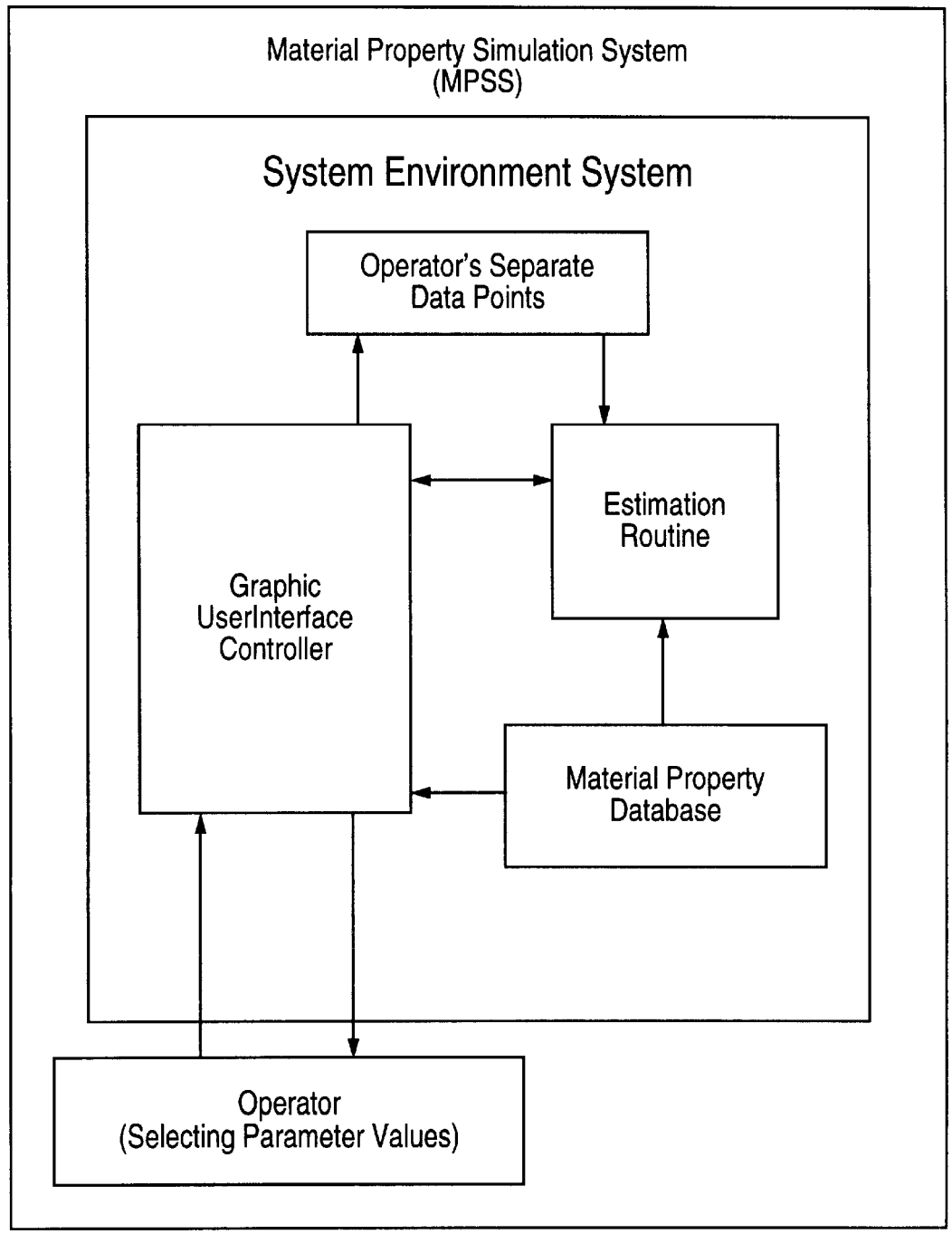
FIG. 1 is a block diagram representing the Material Property Simulation System (MPSS) environment.
Figure 2:
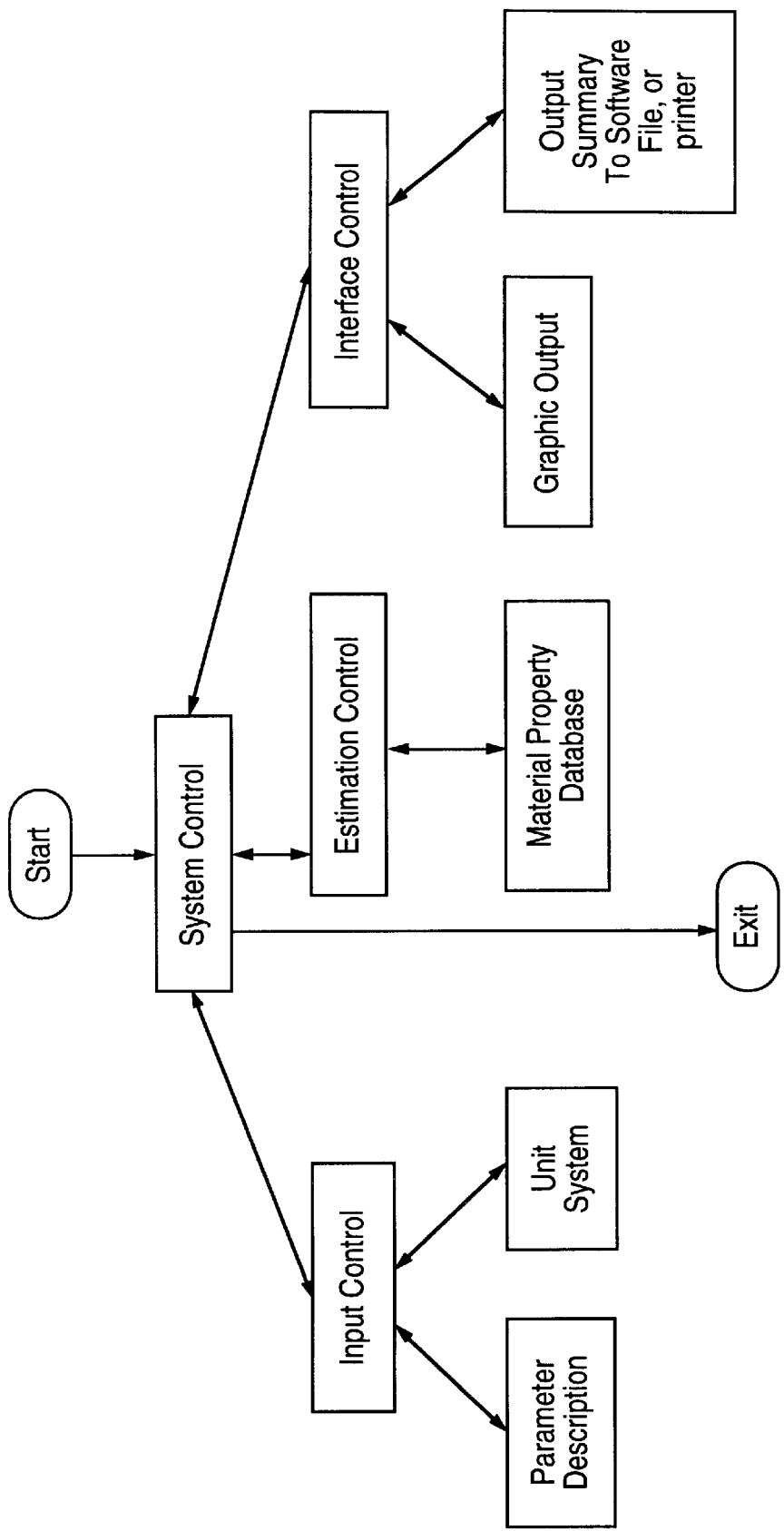
FIG. 2 is a block diagram representing the MPSS control.

Reference will now be made in detail to the present preferred embodiment of the invention, an example of which is illustrated in the accompanying drawings. Referring now to the drawings, wherein similar reference characters designate corresponding parts throughout the several views the theory of operation of laser gyros disclosed and claimed herein will be discussed first with reference to FIGS. 1, 2, and 3(a–g).

The user of this invention will be referred to as the Operator. Just as the methods of the invention do not require a human operator, the use does not. A software program can use the invention by acting as Operator and repetitively entering parameter values and performing analyses on the resulting property values.

The detailed description which follows is presented largely in terms of algorithms and symbolic representations of operations on data within a computer memory, and/or activities of a human user of the invention. These algorithmic descriptions and representations are the means used by those skilled in data processing arts to most effectively convey the substance of their work to others skilled in the art. An algorithm is here, and generally, conceived to be a self-consistent sequence of steps leading to a desired result. These steps are those requiring physical manipulations of physical quantities.

The invention includes an Estimation Routine which manipulates accumulated experimental Data Points. Each Data Point contains parameters and a measured property value, a weight signifying the qualification of the data ($W_v$), and reference to the source of experiment document used.

The property value is a function of the parameters and can be written:

$$PR = f(P_1, P_2, \ldots, P_n)$$

where PR is a property value that is a function of parameter values $P_1$ through $P_n$. Parameters $P_1$ through Pn are alternately called Coordinates in reference to the position that the parameter values describe in an n-dimensional Parameter Space, or Space. When they all contain constant values, P1 through Pn are collectively referred to as a Parameter Set, a Point, Coordinates, or a Location. If only some of them have values while others are variable, they are collectively referred to as a Profile. A Profile describes a portion of the Space containing a subset of the Data Points ("Subset") which may encompass some or all of the Data Points.

Distances between Data Points in an n-dimensional Parameter Space can be computed using a generalized form of the distance formula:

$$\text{Distance from } E \text{ to } F = \sqrt{(E_1 - F_1)^2 + (E_2 - F_2)^2 + \ldots + (E_n - F_n)^2}$$

where $E_n$ is the value of $n^{th}$ parameter of an experimental Data Point and $F_n$ is the value of $n^{th}$ parameter of another Data Point, usually the Operator's requested parameter set.

The Linear Interpolation routine uses the distances computed using this distance formula generalized to n dimensions.

Weighted Averaging is used in the calculations performed by the Estimation Routine to quantify the significance of various data and parameters. The Parameter weight ($W_p$) is used to quantify the influence that a parameter has on a property value relative to the other parameters). The Data Point Weight $W_v$ is used to quantify the credibility of a Data Point relative to other Data Points based on source or measurement method.

The steps in the operation of the MPSS embodied in the preferred embodiment are a follows.

The Operator of the invention selects a material and fabrication process and enters a set parameters for the operation of the fabrication process.

The invention returns estimates of property values that would result if a list of Operator-specified parameter values was used in fabricating and operating the selected material. The estimate is based on multidimensional interpolation, extrapolation and weighted averaging of data in an embedded database. A determination of the associated error is returned along with the estimate.

The Operator may select a tabular or a graphic mode and the invention will display a table or a two- or three-dimensional graph representing the relationships between parameter values and property values. The Operator can choose which property, which parameter(s), the parameter value range(s), the axis scaling, and the unit system for the graphic output. The Operator may choose from standard and arbitrary unit systems for displaying the output.

A Graphic User Interface Controller, or GUIC, (see FIG. 1) receives the input from the Operator and uses the Estimation Routine and Material Property Database to provide the requested output. If the Operator requests a three-dimensional graph, for instance, the GUIC uses the Estimation Routine repetitively to plot many values within the ranges of data for both of the graphically varying parameters. Each time the GUIC uses the Estimation Routine, it must specify the set of Data Points embedded in the Material Property Database that are to be used for Estimation. The Estimation Routine performs multidimensional analysis to estimate the property value—or to estimate values for several different properties—for the set of parameters that the GUIC has requested. The novel function and method used by the Estimation Routine is discussed below in much detail.

For the Driver to employ the Estimation Routine to supply estimates, the following information must be provided:

1. A Table of experimental property values for various combinations of parameter values. Each row of the Table thus contains a Data Point.
2. A number for each parameter indicating how much influence it has on the property value compared to other parameters. (This is a pre-determined constant called a parameter weight, $W_p$.) and
3. The parameters for which the Operator for which the Operator wants a property value.

The Estimation Routine returns the requested property value estimation along with an indication of the method of estimation, a corresponding error estimate and a confidence level. If the Operator's parameters match a Data Point's parameters, the routine returns the corresponding property value from the Table or a weighted average of Data Points, $W_v$, if there are several Data Points with duplicate parameter values. The novel object of the Estimation Routine is the ability to extract an estimate for the Operator's parameters when they are not explicitly listed, using the database of measured parameters and extrapolation, interpolation and estimation techniques.

Data Points for a given material must have the same number and types of reported parameters and the same reported property to be correlated with each other. The method of manipulating the Data Points accommodates any number of parameters since the number of parameters may vary with the material or fabrication process.

The Table of Data Points can vary in width and height because the materials that it can describe have different numbers of parametric dependencies and different amounts of available data. Thus, the multidimensional parameter space (described by the Data Point Table) for which the Estimation Routine will work may vary in size and in density of data depending on the material, fabrication method, or property of interest.

The multi-dimensional Estimation Routine is a function external to the User Interface. In the preferred embodiment, the Estimation Routine is written in C. Its several subroutines which are also written in C. FIGS. 3a–3g and FIG. 4 pertain specifically to the Estimation Routine.

Figure 3A:
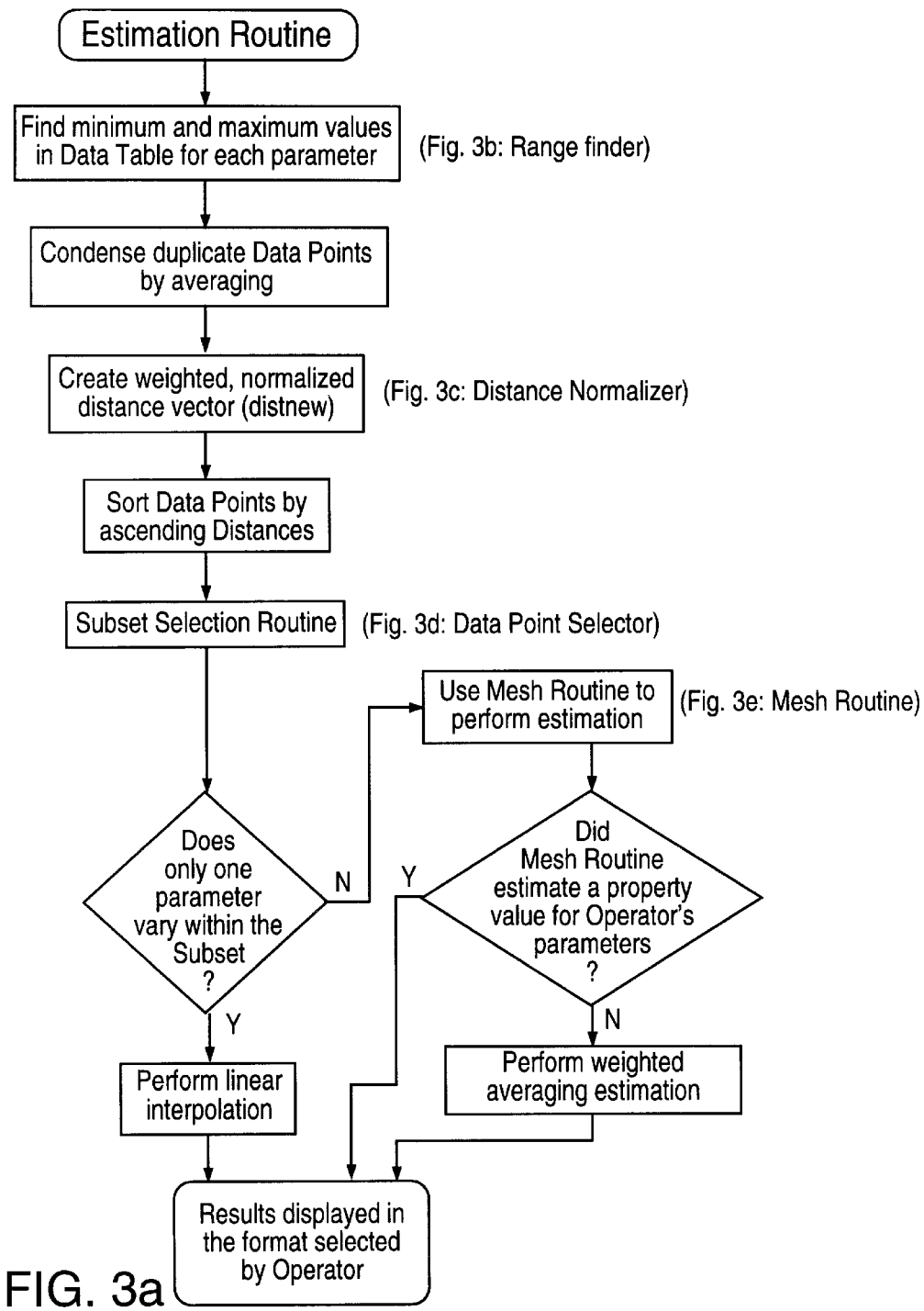
FIGS. 3a–3g are detailed flow diagrams of the MPSS Estimation Routine.
Figure 3B:
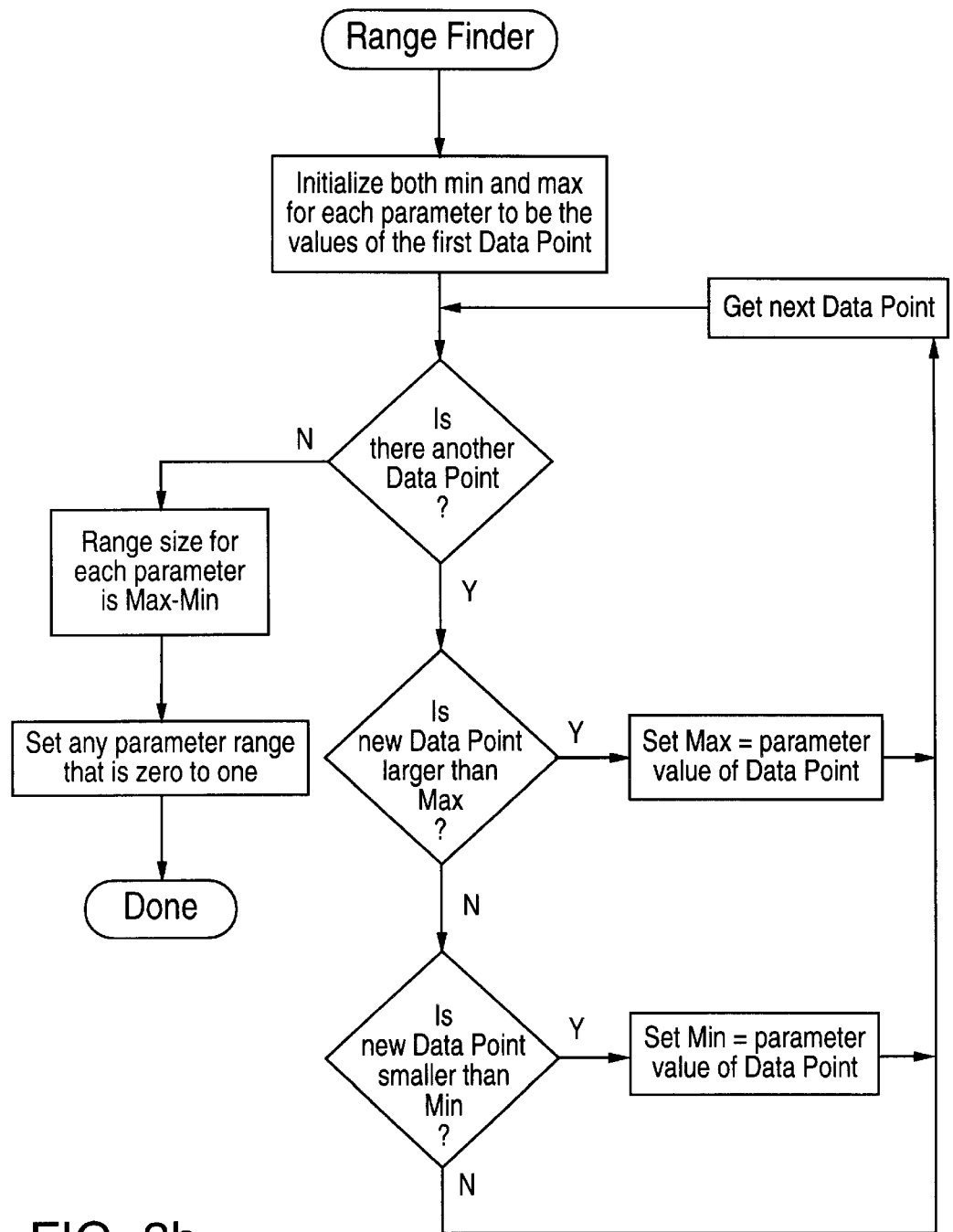
Figure 4:
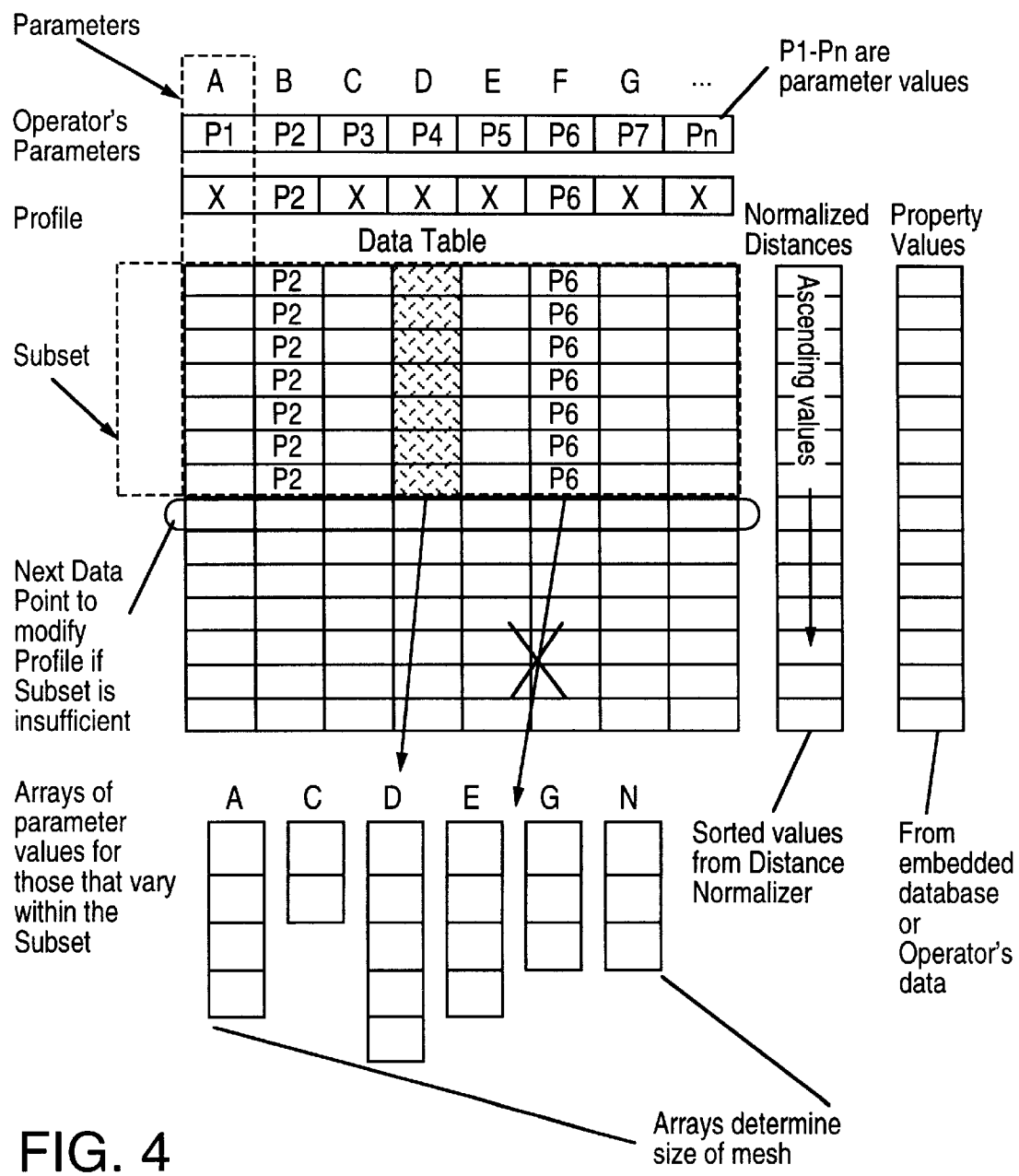
FIG. 4 is a data structure diagram showing initial MPSS data manipulation.

Normalized weighted distances ("Distances") are calculated between the Operator's parameters and each of the parameter sets of the Data Point Table, or Table (see FIG. 4). The Table is sorted and a selection of points are interpolated, averaged or otherwise estimated to obtain the requested property value. A combination of condensation of repeated Data Points, weighted averaging, distance computation and comparison, distance normalization, sorting by distance, and interpolation is used within a system of conditional statements and iterative instruction loops to obtain this result. FIG. 3a shows the overall method used by the Estimation Routine. The discussion below describes this method in more detail.

The first task for the Estimation Routine is to determine which of the Data Points in the Table are most similar, or "closest" to the Operator's parameters. For each Data Point in the Table, a Distance from the Operator's parameters is calculated using the distance formula described in the Notation and Nomenclature section above. As the Distance is being calculated for each Data Point in the Table, the Estimation Routine normalizes it and attaches a Data Point weight($W_v$) to it using the Distance Normalizer. The Distance Normalizer normalizes the Distance based on the range size of each parameter. The range size used by the Distance Normalizer is determined using the Range Finder shown in FIG. 3b.

Figure 3C:
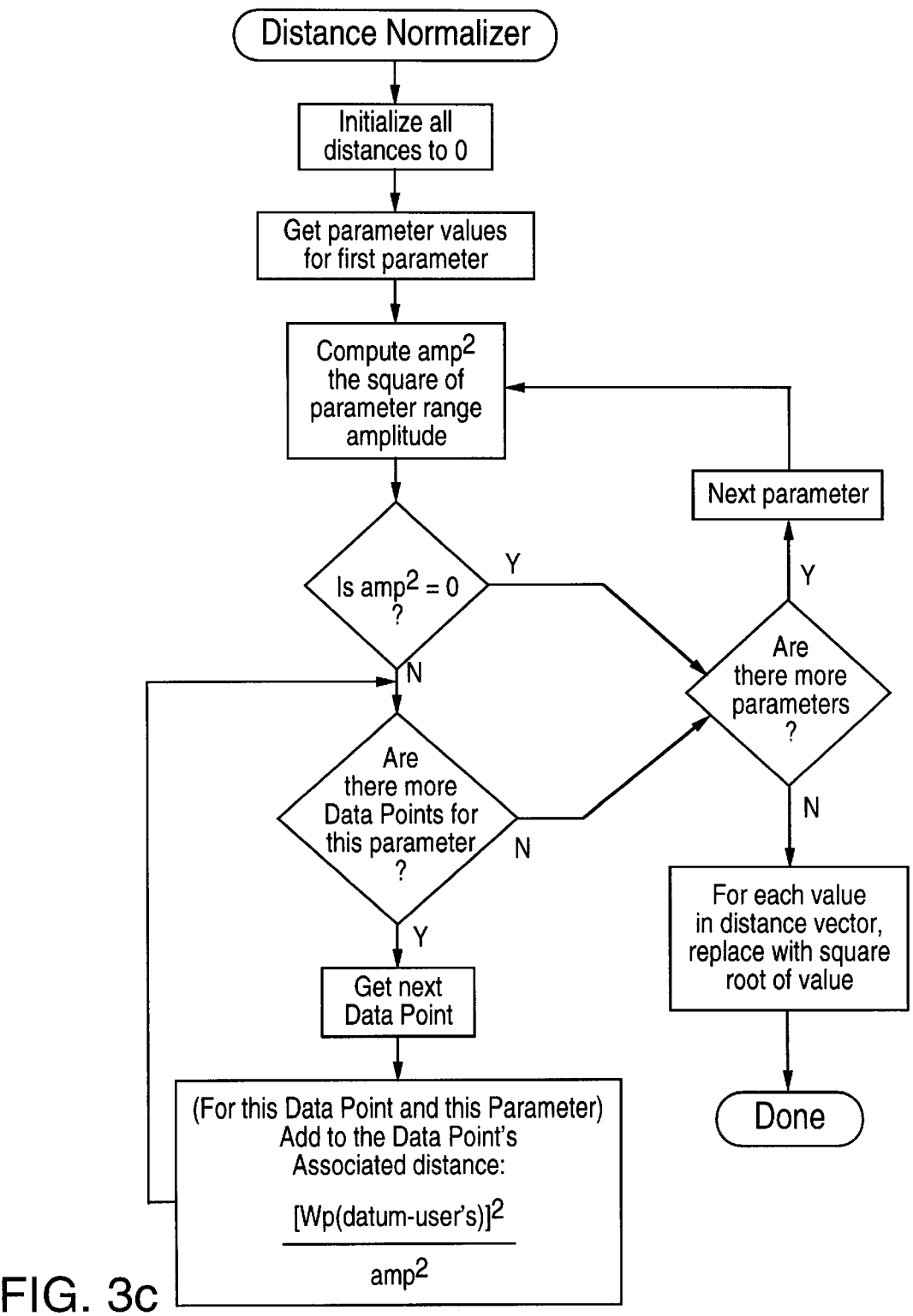
Figure 3D:
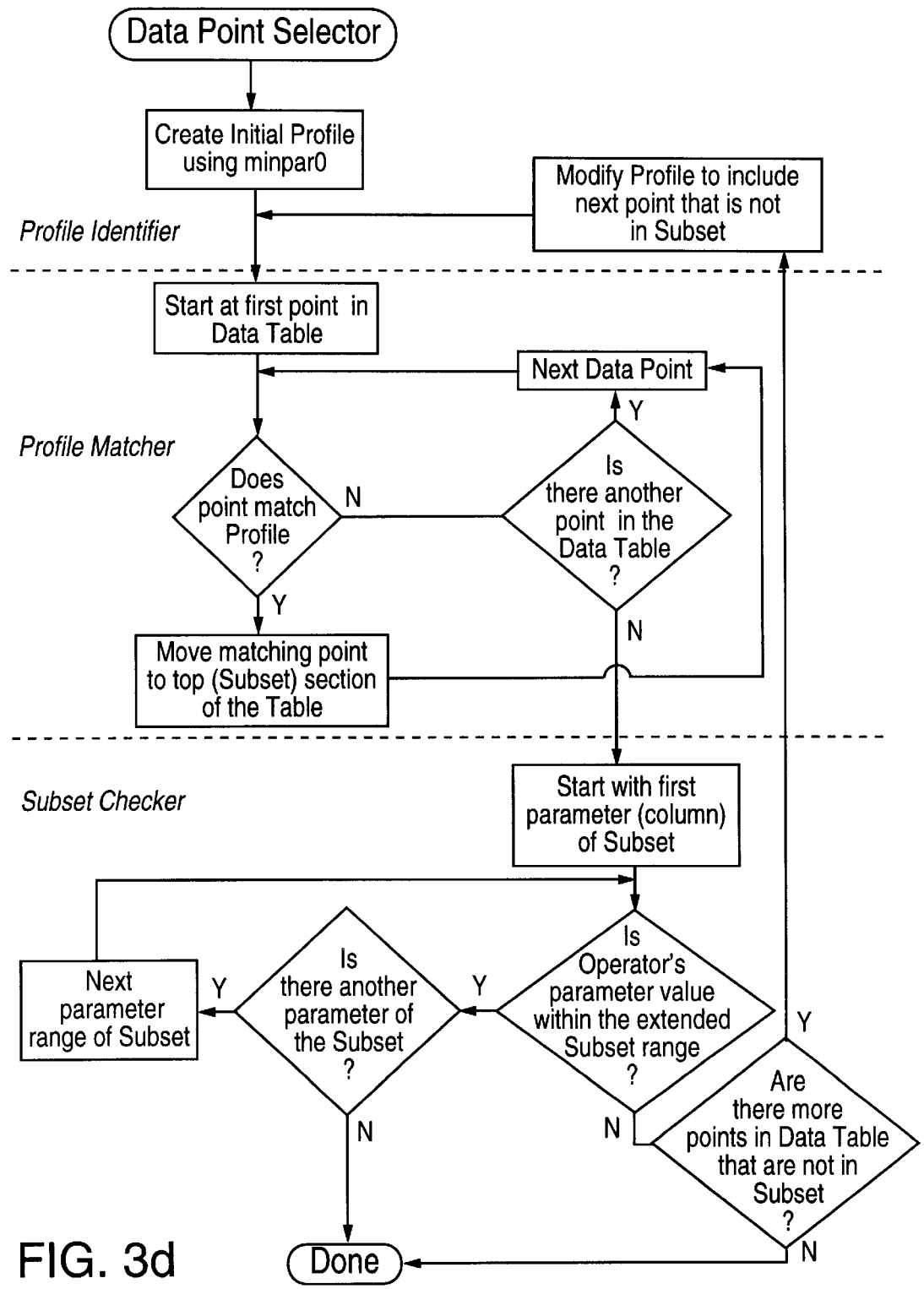
Figure 3E:
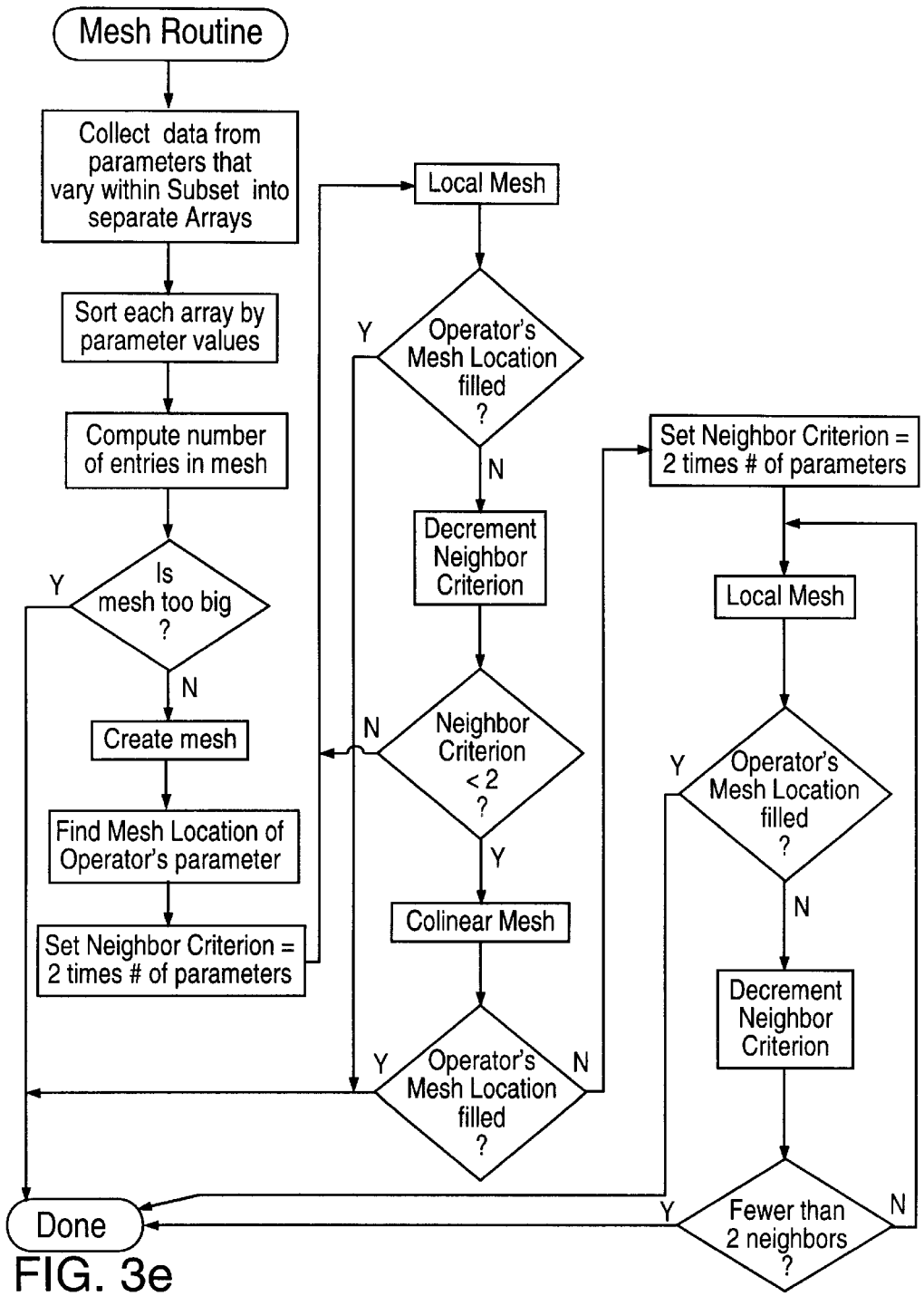
Figure 3F:
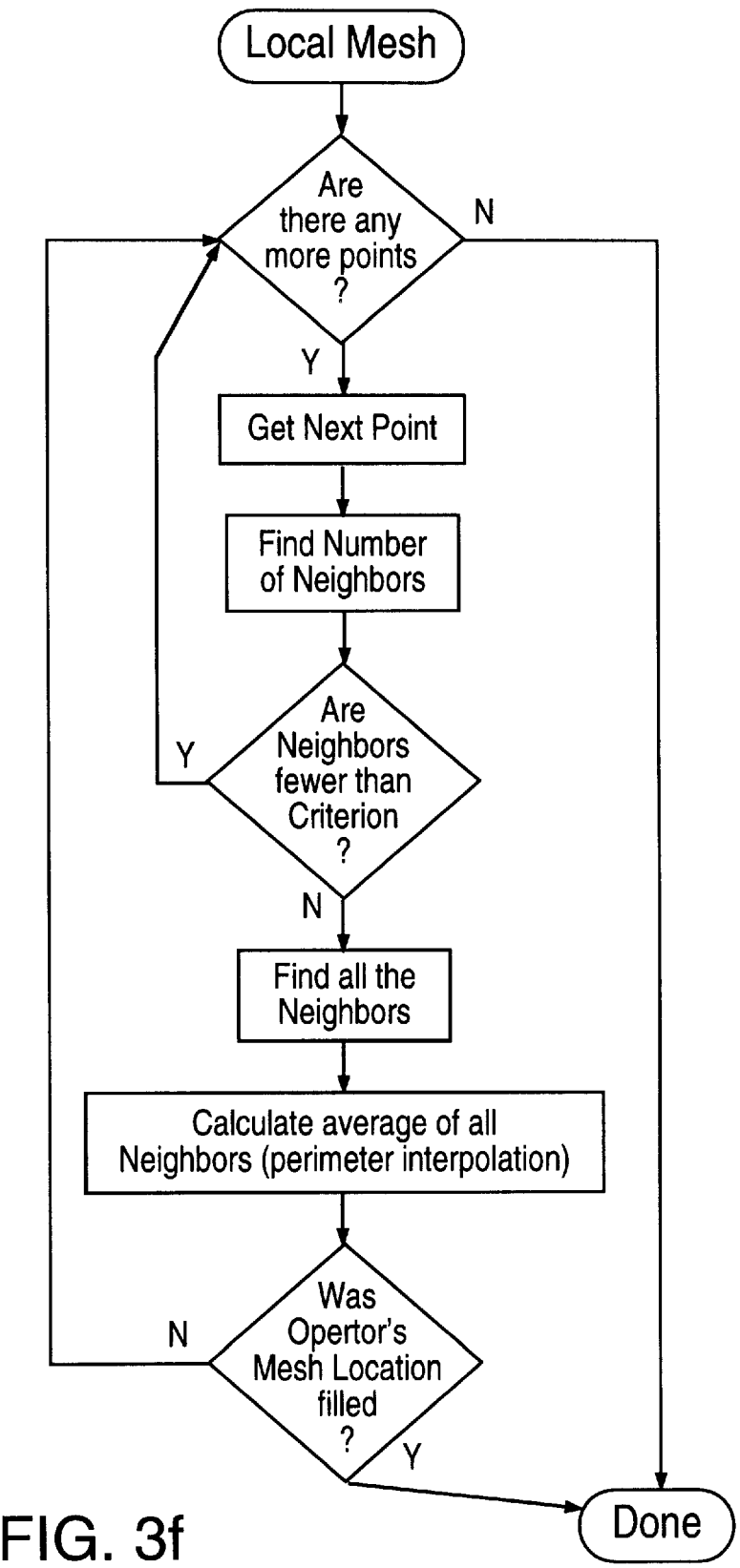

If the Distance is zero for any Data Point in the Table, the Estimation Routine returns the property value for that Data Point or a weighted average if there is more than one with zero Distance (FIG. 3c). The value returned to the Estimation Routine Driver as the property value of the Operator's parameters would be accompanied in this case by a high confidence level indication since no estimation was done.

Normalization is done because each parameter may have a different range, system of units, or influence on the property value.

EXAMPLE

The parameter, annealing temperature, is measured in degrees Centigrade while another parameter, radio frequency power, is measured in Watts. The effect of one degree change in temperature may be very different from one Watt change in power.

The effect of differing units can be neutralized by normalization to range. The effect of one degree change in annealing temperature, for example, is scaled by the range of available data for annealing temperature. The range for each parameter is determined by the Range Finder. The Range Finder searches the Table for the minimum value and maximum value of each parameter and subtracts the former from the latter. The normalization is done by scaling with respect to this range.

Some parameters have a much stronger effect on a property value than others, even if the units are the same and the range of experimental Data Points is the same. To account for this asymmetry, the Estimation Routine multiplies each parameter value in the Table by a predetermined constant proportional to the observed average influence that the parameter has on a property value relative to the influence of other parameters in the available experimental data. This weight is called $W_p$. With applied parameter weights, the Parameter Space is adjusted so that the Distance from the Operator's parameter values to any other Data Point is a measure of the parametric closeness. This can be used to find the Data Points with parameters most similar to the Operator's parameters and presumably most similar to the requested property value.

After computing a normalized, weighted distance for each Data Point, the Table is sorted by ascending Distance (FIG. 3a). The first point in the Table is then the closest to the Operator's parameters as shown in FIG. 4.

A Data Point Selector (FIG. 3d) iteratively searches the Table for a Subset of points sufficient for the Mesh Routine to provide a property estimation for the Operator's parameters (or coordinates). The Data Point Selector is finished when an iteration supplies a sufficient Subset of the Table or when every Data Point has been included in the Subset. The Data Point Selector consists of three main parts: a Profile Identifier, a Profile Matcher, and a Subset Checker.

During the first iteration of the Data Point Selector, the Profile Identifier identifies the coordinates of the closest point that match exactly the Operator's parameters. This set of matching coordinates is termed a Profile (see FIG. 4). If, for example, for a nine parameter property, only the second and sixth coordinates matched exactly, then the Profile would be (X, exact second coordinate, X, X, X, exact sixth coordinate, X, X, X) where X denotes a wild card coordinate value. Subsequent iterations of the Data Point Selector use increasingly expanded versions of the Profile if the selected points of the first iteration were not sufficient for the Mesh Routine.

A Profile Matcher searches the Table for coordinates matching the Profile. It moves Data Points that match the Profile to the top portion of the Table. Collectively, these matched points form a potential Subset on which the Mesh Routine may be performed.

A Subset Checker determines whether the Subset contains sufficient data for the Mesh Routine to make an estimation. If any of the Operator's parameters are outside the extended range of the Subset, then there is not sufficient data. The extended Subset range for each parameter is determined by the span of parameter values that occur in the Subset. Any parameter value that is within 100% above or below the span of parameter values that occur in the Subset is within the extended Subset range. In other words, if while searching the $n^{th}$ parameter of the Subset it can find a, b, or c below, then the $n^{th}$ dimension of the Subset is sufficient.

a. one value greater than and one value less than the Operator's $n^{th}$ parameter
 b. one value equal to the Operator's $n^{th}$ parameter
 c. two values either above or below that are more distant from each other than the closer of the two is from the Operator's $n^{th}$ parameter If the Subset is sufficient, the Mesh Routine is performed.

If any of the parameters are insufficient, the Subset Checker determines that the Subset is insufficient for the Mesh Routine and the Data Point Selector is restarted with an new Profile. The Profile Identifier adds the next point below the Subset (FIG. 4), if there is one, to the Subset and modifies the Profile to account for the added point. The new Profile is created by removing any parameter values from the old Profile that are not the same as the parameter values of the added point and replacing them with wild cards.

Continuing the example above, if the old Profile was: (X, exact second coordinate, X, X, X, exact sixth coordinate, X, X, X) and the new point had a different second coordinate but the same sixth, the new Profile would be: (X, X, X, X, X, exact sixth coordinate, X, X, X). The new Profile defines a Subset that would require eight-dimensional interpolation or meshing instead of the old Profile's seven. The Profile Matcher then generates a Subset to match the new Profile which includes all points of the previous Subset. The new Subset is checked by the Subset Checker.

The Data Point Selector iterates in this manner until a sufficient Subset is found or the entire Table is included in the Subset. When the Subset encompasses the Table, the whole Table is used by the Mesh Routine.

The last major portion of the Estimation Routine is the portion that generates the numerical answer. The method used to realize a numerical estimation depends on the amount of variation of the existing Data Points (FIG. 3a). If only one parameter of the Subset varies from the Operator's parameter values, linear interpolation is performed on the Subset and a solution is returned. If two or more parameters vary within the Subset, the Mesh Routine is used.

The Mesh Routine (FIG. 3e) is composed of four steps. In the first step, the Mesh Routine collects data from the parameters that vary within the Subset. In this way, the number of dimensions for analysis is reduced by one for every nonvariant parameter. In the example Profile above, a nine-dimensional estimation was reduced to an eight-dimensional estimation because of its constant sixth coordinate. Every parameter value in the Subset is stored in an Array for that parameter (see FIG. 4). Each Array is then condensed by removal of duplicate values. The number of values in each Array then determines the Magnitude of the multidimensional mesh in that dimension. The Mesh Routine determines the amount of space that it will require by multiplying the Magnitudes. The mesh is composed of a multidimensional set of discrete data called Mesh Locations. Mesh Locations include permutations of the parameters stored in the Arrays and can be assigned corresponding property values or remain unassigned. Mesh Locations with no assigned property values are called Empty Locations, and Mesh Locations with assigned values are called Filled Locations.

If the space required for the mesh is greater than a predetermined amount, the Mesh Routine will not estimate a property value and instead a weighted averaging is performed. The space limitation is included to prevent the invention from attempting to perform a computation too large for the memory of the processing equipment that is used. The invention is not limited to any maximum calculation size as long as the processing equipment can accommodate it.

If the required amount of space is not prohibitively large, the Mesh Routine may create and store the mesh as a uni-dimensional data structure containing a multidimensional set of data. Any other data structure capable of storing the data is sufficient.

Figure 3G:
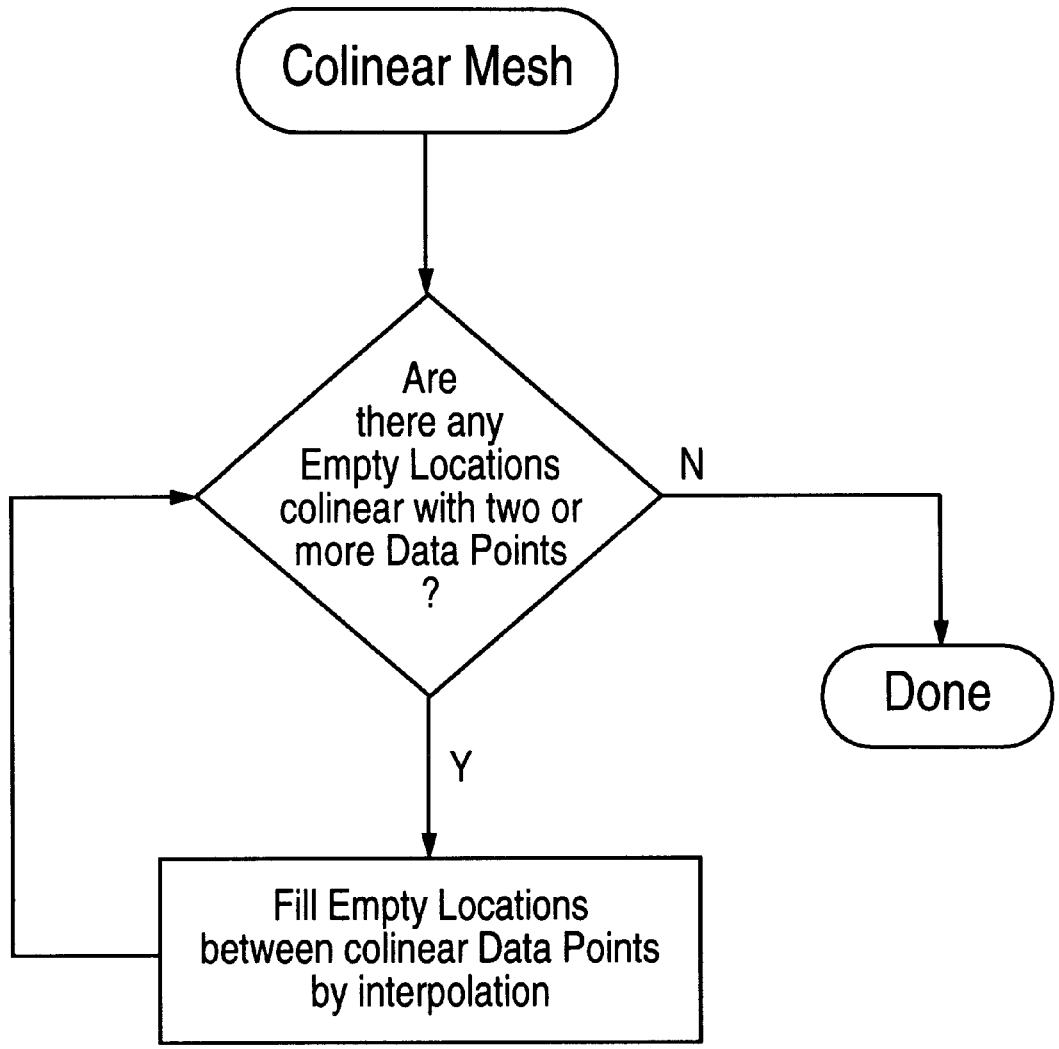

The next three stages use two types of meshing—Local Mesh (FIG. 3f) and Colinear Mesh (FIG. 3g). They are used in the sequence: Local, Colinear, then Local. Local Mesh computes distanced averages for Empty Locations that are adjacent to (or neighbor) points containing property values. Two points are considered adjacent when for each parameter of the points, the parameter values of the points are the same or positioned directly adjacent in the Array for that parameter. Every Filled Location that is adjacent to an Empty Location is called one of the Empty Location's "Neighbors". Colinear Mesh performs linear interpolation to assign property values to Empty Locations that are colinear with two Filled Locations. Two Mesh Locations are considered colinear when all of the parameter values that define their locations in the parameter Arrays are the same except for one. Both Local Mesh and Colinear Mesh iteratively search through the mesh until either the Operator's parameters have been estimated or no more Mesh Locations can be assigned property values.

Local Mesh repetitively searches the entire Mesh in an organized pattern for Empty Locations that have enough Neighbors for an estimated value to be assigned to them. There are enough Neighbors for an Empty Location when the number of Neighbors is greater than or equal to a Neighbor Criterion. For example, an initial Neighbor Criterion can be set to: the number of Neighbors is twice the number of parameters. When Local Mesh finds an Empty Location that meets the Neighbor Criterion, it fills the Mesh Location with a weighted average of all of the adjacent Points. If an exhaustive search of the mesh yields no Empty Locations that meet the Neighbor Criterion, the Neighbor Criterion is decremented by one and Local Mesh is restarted. If an exhaustive search of the mesh does yield new assigned property values, Local Mesh restarts without changing the Neighbor Criterion. If after any search of either Local Mesh or Colinear Mesh a value has been calculated and assigned to the Operator's parameters, the Mesh Routine exits with the value. Once any exhaustive search is completed and no Empty Locations are found with a total of at least two Neighbors, Local Mesh exits. The mesh now contains the original Subset data and the computed points from Local Mesh.

Colinear Mesh then searches through the mesh in an organized pattern for an Empty Location that is also colinear with two Filled Locations. If any are found, a value is calculated for each of them using linear interpolation. The calculated values are assigned to the corresponding Mesh Locations.

Local Mesh is executed again to assign values to any remaining Empty Locations. It performs the same function as it did before Colinear Mesh was performed, except that the number of Filled Locations that it can use as Neighbors has likely been increased by Colinear Mesh. If a property value is estimated for the Operator's parameters, the Estimation Routine exits with the property value, information regarding the method of computation, and accuracy or error estimates discussed above.

If the Mesh Routine fails to calculate a property value for the Operator's parameters after performing the above sequence of routines, a weighted average of the three points with smallest Distances is performed (FIG. 3a). The result of the weighted average is returned from the Estimation Routine with information regarding the method of computation and accuracy or error estimates discussed above.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with the teaching herein, or it may prove more convenient to construct more specialized apparatus to perform the required method steps. The required structure for a variety of these machines will be apparent from the description given below.

The system and method as disclosed can reduce the amount of tabulated data necessary to reach an understanding of systems dependent on more than two variables by filling in blank spaces with data and corresponding confidence levels. It could also assist in objectively determining how well an area of multidimensional space is covered.

In its preferred embodiment, the invention can be used to reduce the time and expense necessary to prototype new thin film materials such as those created for semiconductor devices or microelectromechanical structures including but not limited to sensors and actuators.

The Estimation Routine may be used for simulating any set of linear or nonlinear simultaneous parametric dependencies. It could therefore be used in business and economics research, scientific characterizations of many varieties, or in any other situation requiring multidimensional estimation.

The invention could be used for educational purposes by mapping for students the relationships between phenomena of complicated systems that have overly complex or unknown constitutive relationships.

Other user interfaces could be used to display variations of estimated data in other ways. The System could be integrated in a feedback loop where a control system iteratively uses the Estimation Routine to determine what additional data acquisition is required. This could be done in order to more rapidly obtain the most accurate and confident value for a set of conditions that take longer to set up than the invention requires or are impossible to set up all at the same time. In other words, if the answer is not directly measurable, this method may assist in estimating it, or doing so faster. Or, conversely, a feedback loop could be established to find the parameters that result in an optimized value more quickly in applications where the time response of the data acquisition is longer than the time necessary to use this method. Applications for this might include multidimensional tracking or systems that "learn" what to do as they perform.

Thus, the invention provides a practical and useful method which meets a need in the industry for simplicity, utility, and accuracy. Although a few exemplary embodiments of the present invention have been described in detail above, those skilled in the art will readily appreciate that many modifications are possible without materially departing from the novel teachings and advantages which are described herein. Accordingly, all such modifications are intended to be included within the scope of the present invention, as defined by the following claims.

Having hereby described our invention, what is claimed is:

1. A system for predicting material properties of materials used in a fabrication process, comprising:
   input means for providing process parameter values for the fabrication process;
   storage means for storing a plurality of data points, each data point including a set of weighted process parameter values and a measured property value;
   relation means for repetitively interrelating said input process parameter values with said data points based on a normalized weighted average between each set of weighted process parameter values and said input process parameter values;
   calculation means for predicting the material properties based on the interrelated process parameter and material property values; and
   output means for providing graphical representations of the predicted material properties.

2. The system for predicting material properties of claim 1, further comprising user-interface means for varying the process parameters of the fabrication process.

3. A method for predicting physical properties of a material subjected to a fabrication process comprising the steps of:
   determining process parameters of the material and the fabrication process;
   repetitively estimating material property values for parameter sets intermediate to one or more stored process parameter sets and said determined process parameters;

interrelating stored and estimated process parameters and material properties with said determined process parameters said interrelation comprising steps of interpolation, extrapolation and estimation;

calculating a convergent numerical solution to the interrelated parametric relations;

estimating the physical properties of the material form based upon a mesh based convergent numerical solution; and controlling said material process based upon said estimated physical properties.

4. The system for predicting material properties of claim 1, wherein said relation means for repetitively interrelating includes means for interpolating, extrapolating, and estimating.

5. An estimation module for estimating material property values based on a plurality of input parameters for a fabrication process, comprising:

a range finder module for determining a minimum value and a maximum value for a plurality of stored weighted parameters;

a distance normalizer module in communication with the range finder module for determining a weighted normalized distance between the plurality of input parameters for the fabrication process and a plurality of data points, wherein each data point includes a set of the stored parameters;

a data point selector module in communication with the distance normalizer module for iteratively searching the plurality of data points for a subset of data points sufficient to estimate the material property values; and a mesh module in communication with the data point selector module for estimating the material property values based on the subset of data points searched for by the data point selector module such that the estimated material property values may be displayed relative to the data points according to one of a graphical representation and a tabular representation.

6. A computer-assisted method for estimating material property values based on a plurality of input parameters for a fabrication process, comprising:

determining a weighted normalized distance between the plurality of input parameters for the fabrication process and a plurality of data points, wherein each data point includes a set of the stored weighted parameters;

sorting the plurality of data points according to ascending weighted normalized distances;

iteratively searching the sorted plurality of data points for a subset of data points sufficient to estimate the material property values;

estimating the material property values based on the subset of data points;

displaying one of a graphical representation of the estimated material property values and a tabular representation of the estimated material property values.

7. The method of claim 6, wherein estimating the material property values includes performing a mesh routine on the subset of data points.

8. The method of claim 7, wherein performing a mesh routine includes performing a local mesh routine.

9. The method of claim 8, wherein performing a local mesh routine includes computing a weighted averaged distances between a data point not having an assigned property value and a data point having an assigned property value.

10. The method of claim 7, wherein performing a mesh routine includes performing a colinear mesh routine.

11. The method of claim 10, wherein performing a colinear mesh routine includes performing a linear interpolation to assign a property value to a data points based on two colinear data points having assigned property values.

12. A material property simulation system for predicting material properties of materials used in a fabrication process, comprising:

a material property database;

an estimation module in communication with the material property database, wherein the estimation module includes:

a range finder module for determining a minimum value and a maximum value for a plurality of weighted parameters stored in the database;

a distance normalizer module in communication with the range finder module for determining a weighted normalized distance between a plurality of input parameters for the fabrication process and a plurality of data points stored in the database, wherein each data point includes a set of the weighted parameters;

a data point selector module in communication with the distance normalizer module for iteratively searching the plurality of data points stored in the database for a subset of data points sufficient to estimate the material property values; and a mesh module in communication with the data point selector module for estimating the material property values based on the subset of data points searched for by the data point selector module; and a graphic user interface controller in communication with the mesh module for displaying one of a graphical representation of the estimated material property values and a tabular representation of the estimated material property values.

13. A computer-readable medium for estimating material property values based on a plurality of input parameters for a fabrication process, having stored thereon instructions, which when executed by a processor, cause the processor to:

determine a weighted normalized distance between the plurality of input parameters for the fabrication process and a plurality of data points, wherein each data point includes a set of the stored weighted parameters;

sort the plurality of data points according to ascending weighted normalized distances;

iteratively search the sorted plurality of data points for a subset of data points sufficient to estimate the material property values;

estimate the material property values based on the subset of data points, and display one of a graphical representation of the estimated material property values and a tabular representation of the estimated material property values.

14. The computer-readable medium of claim 13, having further stored thereon instructions, which when executed by the processor, cause the processor to perform a mesh routine on the subset of data points.

15. The computer-readable medium of claim 14, having further stored thereon instructions, which when executed by the processor, cause the processor to perform a local mesh routine.

16. The computer-readable medium of claim 14, having further stored thereon instructions, which when executed by the processor, cause the processor to perform a colinear mesh routine.

17. A system for predicting material properties of materials used in a fabrication process, comprising:

input means for providing process parameter values for the fabrication process;

storage means for storing a plurality of data points, each data point including a set of weighted process parameter values and a measured property value;

relation means for repetitively interrelating said input process parameter values with said data points based on a normalized weighted average between each set of weighted process parameter values and said input process parameter values;

calculation means for predicting the material properties based on the interrelated process parameter and material property values; and output means for providing tabular representations of the predicted material properties.

18. The system of claim 17, wherein said relation means for repetitively interrelating includes means for interpolating, extrapolating, and estimating.

* * * * *